United States Patent [19]

Goujard et al.

[11] Patent Number: 5,514,453
[45] Date of Patent: May 7, 1996

[54] METHOD OF MANUFACTURING A COMPOSITE

[75] Inventors: Stéphane Goujard; Pascal Dupel, both of Merignac; René Pailler, Cestas; Xavier Bourrat, Bordeaux, all of France

[73] Assignee: Societe Europeenne de Propulsion, Suresnes, France

[21] Appl. No.: 467,206

[22] Filed: Jun. 6, 1995

Related U.S. Application Data

[62] Division of Ser. No. 243,633, May 16, 1994.

[30] Foreign Application Priority Data

May 24, 1993 [FR] France .................. 93 06139

[51] Int. Cl.⁶ .................. B32B 9/00; C23C 16/02
[52] U.S. Cl. .................. 428/213; 428/220; 428/245; 428/332; 428/336; 428/364; 428/368; 428/378
[58] Field of Search .................. 428/213, 220, 428/245, 332, 336, 364, 368, 378

[56] References Cited

U.S. PATENT DOCUMENTS 5,334,438  8/1994  Saugnac .................. 428/212

Primary Examiner—Patrick J. Ryan
Assistant Examiner—Richard Weisberger
Attorney, Agent, or Firm—Weingarten, Schurgin, Gagnebin & Hayes

[57] ABSTRACT

The pyrolytic carbon lamellar interphase is formed on the reinforcing fibers inside a chamber in which a plurality of successive cycles is performed, each cycle comprising: injecting a reaction gas in which the pyrolytic carbon precursor is selected from alkanes, excluding methane taken as a sole component, alkenes, alkynes, and aromatic hydrocarbons, and mixtures thereof; the gas is maintained inside the chamber for a first predetermined time period to form an interphase layer of controlled thickness of nanometer size; the gaseous reaction products are then evacuated during a second time period; the cycles being performed consecutively in the chamber until the thickness desired for the interphase has been obtained, thereby achieving a lamellar interphase that is highly anisotropic, whose lattice fringe texture has distorted fringes of total length ($L_2$) not less than 4 nanometers on average with maximum values exceeding 10 nanometers.

6 Claims, 2 Drawing Sheets

METHOD OF MANUFACTURING A COMPOSITE

This application is a division of application Ser. No. 08/243,633, filed May 16, 1994.

The present invention relates to composite materials including fiber reinforcement densified by a matrix with a lamellar interphase of pyrolytic carbon ("pyrocarbon") between the reinforcing fibers and the matrix.

A particular field of application for the invention concerns that of thermostructural composite materials. Such materials are characterized by mechanical properties that make them suitable for constituting structural elements, and by the ability to retain those mechanical properties at high temperatures. Thermostructural composite materials are used, in particular, for making parts of engines or of reactors, or structural elements of space vehicles that are exposed to severe heating.

Examples of thermostructural composite materials include carbon/carbon composites (C/C) that comprise carbon fiber reinforcement and a carbon matrix, and ceramic matrix composites (CMC) that comprise reinforcement of refractory fibers (carbon or ceramic) together with a ceramic matrix. Current CMCs are C/SiC composites (carbon fiber reinforcement and silicon carbide matrix), and SiC/SiC composites (reinforcement of fibers based on silicon carbide, and matrix of silicon carbide).

Composite materials in which the reinforcement is made from long fibers are known for possessing greater toughness and greater mechanical strength than the corresponding monolithic materials.

With thermostructural composites, it is also known that obtaining higher toughness is made easier by providing an interphase between the fibers and the matrix, which interphase improves load transfer between the matrix and the fiber. Simultaneously the interphase allows, on the one hand, deflection of the cracks that appear in the matrix when the material is subjected to mechanical stresses, so that the cracks do not propagate into the fibers, and, on the other hand, relaxation of the residual stresses at the tips of the cracks.

To achieve these aims, proposals have been made in U.S. Pat. Nos. 4,752,503 and 5,026,604 to form an interphase of lamellar microtexture on the reinforcing fibers prior to densifying the matrix. This is achieved by forming a layer of pyrolytic carbon (PyC) of the rough laminar type or a layer of boron nitride (BN) on the fibers by chemical vapor infiltration or deposition. The way the atomic planes are grown gives the interphase its lamellar microtexture. In the resulting final material, when a crack reaches the interphase after propagating through the matrix, its mode of propagation is modified such that the crack is deflected parallel to the planes of atoms in the interphase, and thus parallel to the fiber, thereby protecting the fiber. In addition, because of its shear elasticity, the PyC or BN lamellar interphase allows relaxation of the stresses at the tip of the crack. Thus, the material retains its mechanical properties, and consequently presents a toughness that is much higher than would the same monolithic material.

It is well known that the microtexture of a PyC obtained by chemical vapor infiltration or deposition depends on the infiltration or deposition conditions, and in particular on temperature and pressure. Thus, depending on these parameters, it is possible to obtain anisotropic PyC (lamellar microtexture) such as rough laminar type PyC, or not very anisotropic PyC (non-lamellar microtexture) such as dark laminar type PyC. Unfortunately, it has been observed that during the deposition of a PyC interphase having a thickness that is typically greater than about 100 nanometers inside a preform, it is possible to observe a variation of the microtexture of the PyC in the interphase from the rough laminar type to the dark laminar type, for example, even without modification of the operating conditions. As a result of such non-controlled variation, the interphase no longer presents optimum microtexture, with the main consequence that the mechanical properties of the composite material are not as high as those theoretically expected from the reinforcing ability of the fibers.

An object of the invention is therefore to provide a composite material having a pyrolytic carbon lamellar interphase between the reinforcing fibers and the matrix which is anisotropic and has a controlled microtexture.

Another object of the invention is to provide a method enabling a composite material to be obtained with an improved pyrolytic carbon interphase, having controlled lamellar microtexture, and without requiring deposition operations that are lengthy and expensive.

These objects are achieved by a method of the type comprising implementing fiber reinforcement in which the fibers are provided with a lamellar interphase coating of anisotropic pyrolytic carbon obtained by chemical vapor infiltration or deposition, and densification of the fiber reinforcement provided with the lamellar interphase by means of a matrix, in which method, according to the invention, the pyrolytic carbon lamellar interphase is formed on the reinforcing fibers inside a chamber in which a plurality of successive cycles is performed, each cycle comprising: injecting a reaction gas in which the pyrolytic carbon precursor is selected from alkanes, excluding methane taken as a sole component, alkenes, alkynes, and aromatic hydrocarbons, and mixtures thereof; the gas is maintained inside the chamber for a first predetermined time period to form an interphase layer of controlled thickness of nanometer size; the gaseous reaction products are then evacuated during a second time period; the cycles being performed in the chamber until the thickness desired for the interphase has been obtained, thereby achieving a lamellar interphase that is highly anisotropic, whose lattice fringe texture has distorted fringes of total length not less than 4 nanometers on average with maximum values exceeding 10 nanometers.

A feature of the invention consists in the interphase being built up elementary layer by elementary layer, each layer being of a thickness of nanometer size, i.e. being preferably less than 10 nanometers thick. The microtexture and the thickness of each layer can then be accurately controlled by the accurate conditions established during each cycle for chemical vapor infiltration or deposition and for the duration of the cycle. This avoids unwanted changes in the microtexture of the interphase, of the kind that have been observed in the prior art when the interphase is formed in a single operation of chemical vapor infiltration or deposition.

Another feature of the invention consists in selecting the gaseous phase and the deposition conditions during the cycles (temperature, pressure, and cycle duration) so as to obtain a pyrolytic ,carbon that is highly anisotropic. Characteristics of the pyrolytic carbon include its relatively high value for the total fringe length in an elementary layer, as defined below, and a relatively low value for the number N of elementary layers that are stacked coherently along the crystallographic axis c perpendicular to the general direction of the fringes in the elementary planes of the pyrolytic carbon texture. This reduced coherence in the column direction (c axis) is encouraged by performing deposition in cycles.

The pyrolytic carbon precursor contained in the gaseous phase is propane, propylene, or a mixture of those two gases.

The deposition temperature preferably lies in the range 900° C. to 1,000° C., with the range 900° C. to 950° C. being particularly suitable when the precursor gas is propylene, and the range 950° C. to 1,000° C. being particularly suitable when the precursor gas is propane.

The pressure preferably lies in the range 2 kPa to 5 kPa. Each first portion of a cycle during which the gaseous phase is admitted into and maintained within the chamber until an elementary layer of nanometer dimensions is obtained has a duration $D_A$ (deposition stage) which is limited to a few seconds or a few tens of seconds, e.g. lying in the range 2 seconds to 30 seconds. Each second portion of a cycle, during which the gaseous reaction products are evacuated from the chamber, e.g. by pumping or by sweeping using an inert gas, is of a duration that does not normally exceed one or several seconds. Since the cycles follow one another in consecutive manner, and advantageously without interruption, and since the duration of each cycle is very short, the total time required for forming the interphase is relatively short, even when several tens of cycles are required.

The above values of temperature, pressure, and deposition stage duration are given for an installation that performs chemical vapor infiltration in which the infiltration chamber has a dead volume that is relatively small, being equal to about 100 cm³. Depending on the installation used, the optimum values for obtaining the desired highly anisotropic pyrolyric carbon are liable to vary, while being likely to remain within or very close to the ranges specified.

The lamellar interphase may be formed on the reinforcing fibers at any stage during manufacture of the reinforcement, from the fiber roving stage to a built-up multidirectional fiber preform having the shape of the composite material part to be obtained, and including any intermediate stage, e.g. a cloth obtained by weaving fiber roving. Nevertheless, it is preferable for the interphase to be deposited directly on the preform during the last stage of making the fiber reinforcement and for that to be done by chemical vapor infiltration.

The invention also provides a composite material as obtained by the method defined above, having fiber reinforcement that is densified by a matrix and a lamellar interphase coating of pyrolyric carbon formed between the reinforcing fibers and the matrix, in which material, according to the invention, the lamellar interphase is constituted by a highly anisotropic pyrolyric carbon whose 00.2 lattice fringe texture has distorted fringes of total length $L_2$ that is on average not less than 4 nanometers with a maximum value that exceeds 10 nanometers, and in which the number N of elementary layers stacked coherently along the c crystallographic axis is on average not more than 4. Thus, compared with rough laminar type pyrolyric carbon as obtained by the methods of the prior art, in the material of the invention, the interphase has lateral organization that is more marked (greater $L_2$) and column organization (along the c axis) that is less marked (smaller N). As a result the interphase is of lamellar nature that is optimized relative to the properties required of such an interphase, and as specified at the beginning of the description.

The invention will be better understood on reading the description and the examples that are given below by way of non-limiting indication.

Reference is made to accompanying drawings, in which.

Figure 1:
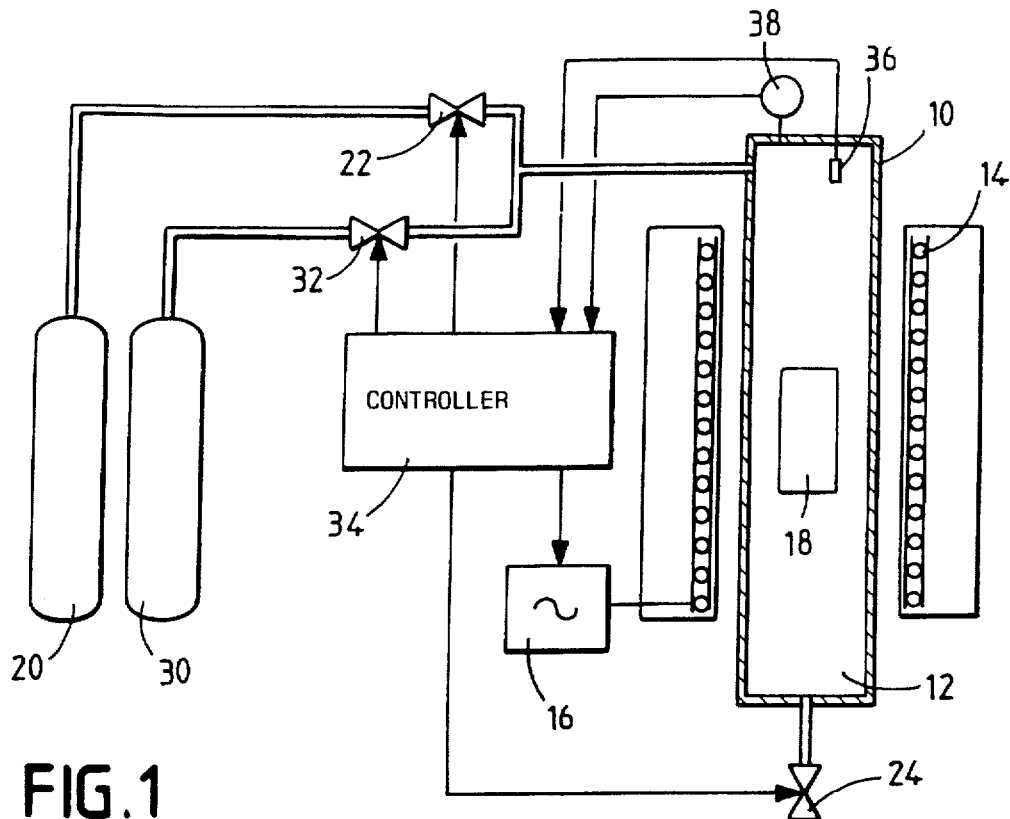
FIG. 1 is a highly diagrammatic overall view of an installation suitable for implementing the method of the invention.

An installation enabling the method of the invention is to be performed is shown in FIG. 1. The installation is of the type commonly used for performing chemical vapor infiltration operations. In conventional manner, it comprises a graphite induction furnace 10 defining a reaction chamber 12. The furnace 10 is surrounded by a metal inductor 14 with thermal insulation being interposed therebetween. The assembly comprising the furnace 10 and the inductor 14 is housed within a sealed enclosure, e.g. as described in document WO-A-87/04733.

A fiber substrate 18 whose fibers are to be coated with a pyrolytic carbon (PyC) interphase of lamellar microtexture is disposed within the chamber 12. The substrate 18 may be constituted by fiber roving, threads, cloth, or other two-dimensional structures (sheets of threads or of unidirectional cables, layers of felt, . . . ), or indeed it may be in the form of three-dimensional structures constituting performs for composite materials parts that are to be made in application of the invention. The PyC interphase is formed on the fibers of the substrate 18 by sequential deposition of layers having nanometer-sized thickness. Each layer is formed by admitting a reaction gas into the chamber such that under the predetermined conditions of pressure and temperature within the chamber, the looked-for PyC deposit is obtained by the gas decomposing on coming into with the fibers of the substrate 18.

The gas suitable for forming the PyC deposit is admitted into the top portion of the chamber 12 from a source of gas 20 via an injection valve 22.

After each interphase layer has been formed, the gaseous reaction products including the remainder of the reaction gas are extracted through the bottom of the chamber 12. Extraction is implemented by opening a stop valve 24, thereby putting the chamber 12 into communication with a vacuum pump 26 via a liquid nitrogen trap 28 that serves to retain undesirable gas species and to avoid them being dumped into the ambient medium. Reaction gas extraction by means of a vacuum pump may be replaced or associated with the chamber 12 being swept by an inert gas, such as nitrogen or argon, which gas is injected into the enclosure from a source 30 and via an injection valve 32.

The valves 22, 24, and 32 are controlled by a controller 34. The controller also receives signals coming from sensors 36 and 38 that are representative of the temperature and the pressure within the enclosure. On the basis of these signals, the controller controls an electrical power supply 16 for the inductor 14 to cause a predetermined temperature to obtain within the chamber 12, and it controls the stop valve 24 so that a determined pressure is obtained inside the enclosure before each admission of reaction gas.

According to a feature of the invention, the lamellar interphase is made by chemical vapor infiltration performed in pulsed manner. Each layer constituting the interphase is formed during a cycle that comprises injection of the reaction gas, with said gas then being maintained for a predetermined duration (first portion of the cycle) after which the reaction products are extracted (second portion of the cycle). Advantageously, the cycles follow one another without interruption. It is thus possible to make successive layers of PyC that are of controlled thickness of nanometer dimensions (i.e. less than 10 nanometers thick).

Figure 2:
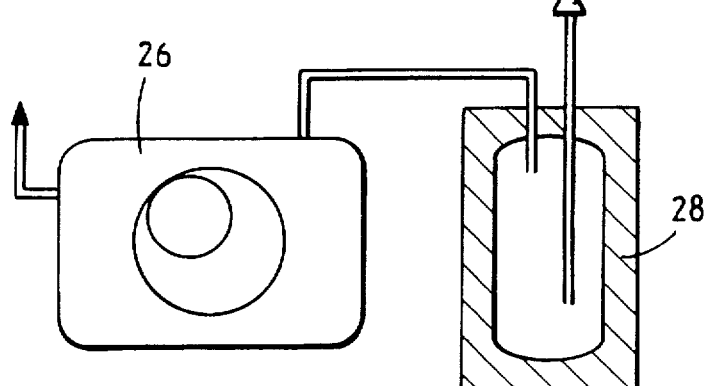
FIG. 2 is a graph showing how pressure varies as a function of time within the chemical vapor infiltration chamber of the FIG. 1 installation, while implementing the method of the invention for forming a pyrolytic carbon interphase.
Figure 2:
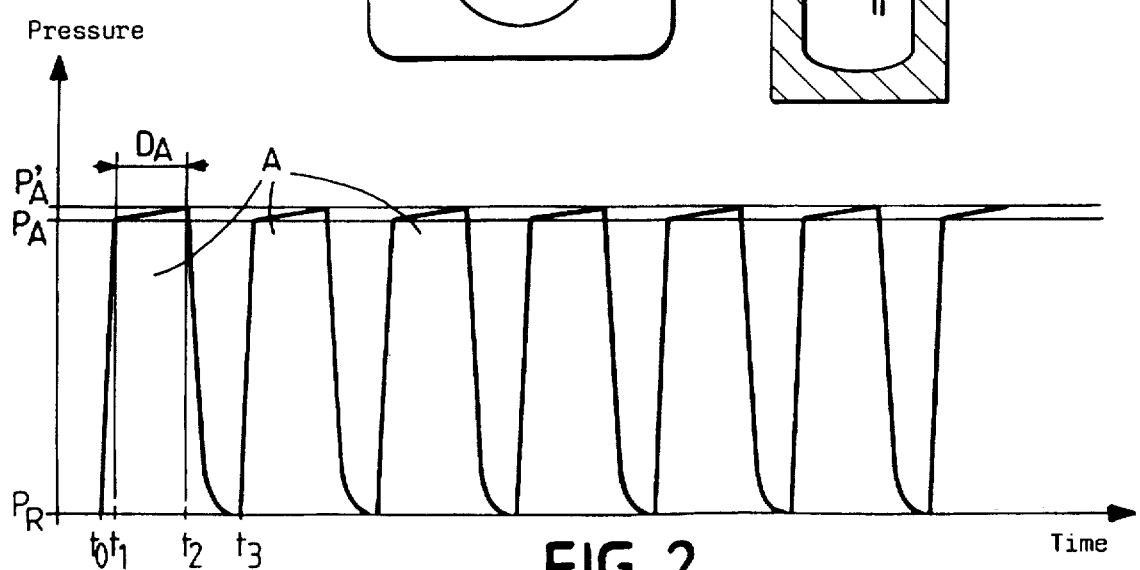

This succession of cycles is illustrated in FIG. 2. At the beginning of a cycle A (at time $t_0$), the residual pressure inside the chamber has a value $P_R$. Admission of the reaction gas causes pressure to rise suddenly within the chamber. This admission is achieved by the controller 34 opening the injection valve 22 for the length of time that is required, given the flow rate of the gas, to cause a desired pressure $P_A$ to be achieved inside the chamber 12 (at time $t_1$). Interphase layer deposition continues until time $t_2$, at which point the stop valve 24 is opened by the controller 34, thereby causing the reaction products to be extracted and the pressure inside the chamber 12 to drop down to the value $P_R$ where the pressure is maintained until time $t_3$ marking the beginning of the following cycle. The time interval of duration $D_A$ between times $t_1$ and $t_2$ defines the stage for deposition purposes. At the end of this stage, the pressure in the chamber has a value $P'_A$.

The duration $D_A$ of the deposition stage is selected in particular as a function of the thickness desired for each elementary layer. As described below, in order to form a layer of nanometer-sized thickness and having the microtexture that is looked-for in this case, the duration $D_A$ is a few seconds to a few tens of seconds, it being understood that the deposition rate also depends on temperature, pressure, chamber geometry, . . . .

The time required to go from residual pressure $P_R$ to working pressure $P_A$ is generally about 1 second or less than 1 second, whereas the time required for extracting the reaction products and for returning to the pressure $P_R$ is generally several seconds, and at most about 10 seconds.

As a result, the total duration of a cycle (between times $t_0$ and $t_3$) can be limited to a few tens of seconds. Thus, even when several tens of cycles are necessary for achieving the total thickness desired for the interphase (at least 100 nanometers, and generally several hundreds of nanometers), the total time required for forming the interphase is relatively short.

In the example illustrated in FIG. 2, the various cycles are identical, with pressure pulses in the chamber being of the same amplitude and of the same duration. The interphase is thus built up of layers having the same microtexture and the same thickness, with the shortness of each cycle making it possible to control these two characteristics reliably.

However, it is possible to build up an interphase in which the microtexture and/or the thickness of the elementary layers varies in controlled manner. To do this, it suffices to modulate the values of $P_A$ and/or of $D_A$ under the control of the controller 34. In particular, for given conditions of temperature and pressure that give rise to an anisotropic pyrolyric carbon in accordance with the invention, increasing the duration of the pause $D_A$ gives rise to successive deposits of pyrolytic carbon having different microtextures within a layer (PyC of the invention plus columnar PyC).

According to a characteristic of the present invention, the conditions under which the PyC interphase is deposited are selected so as to obtain a lamellar microtexture that is highly anisotropic. To this end, it has been determined that the pyrolyric carbon precursor gas or "source gas" constituting the reaction gas must be selected from alkanes with the exclusion of methane taken as a sole component, alkenes, alkynes, and aromatic hydrocarbons, and mixtures thereof. The Applicant has been able to observe that alkanes such as propane and butane, alkenes such as propylene and ethylene, and alkynes such as acetylene and aromatic hydrocarbons such as benzene all constitute excellent precursor gases.

In addition, with an installation in which the reaction chamber 12 has a dead volume of 100 cm³, the values for the deposition temperature T, the pressure $P_A$, and the duration $D_A$ of a deposition pause should preferably be such that:

900° C. $\leq$ T $\leq$ 1,000° C.;

2 kPa $\leq P_A \leq$ 5 kPa; and

2s $\leq D_A \leq$ 30 s

When the precursor gas is propane, the temperature T preferably lies in the range 950° C. to 1,000° C., whereas with propylene it may be lowered to a value lying in the range 900° C. to 950° C. Once an appropriate combination of the parameters T, $P_A$, and $D_A$ has been determined, any increase in one or two of said parameters must be compensated by a decrease in the remaining parameter(s).

A PyC interphase can be structurally characterized by transmission electron microscopy. The observed sample is placed at Bragg angle 00.2 making it possible to obtain an image of the fringes of the 00.2 lattice. The fringe texture of the 00.2 lattice can be characterized by magnitudes $L_1$, $L_2$ and N (FIG. 3) defined as follows:

$L_1$ is the length of a rectilinear fringe (or part of fringe) for which contrast remains high; it is limited either by physical limits of the aromatic plane, or else by distortion thereof, e.g. a change in angle or twisting along the axis parallel to the observation beam which is marked by a drop in contrast.

$L_2$ is total tinge length, whether distorted or otherwise; it is limited by the limits of the aromatic plane that are considered as corresponding to total losses of contrast.

N characterizes the organization of files of layers along the crystallographic axis c; it corresponds to the number of layers that are stacked coherently (in a column) in full or in part only.

This method of characterization is known per se. Reference may be made to the following:

A. Oberlin (1989) High resolution TEM studies of carbonization and graphitization, published in Chemistry and Physics of Carbon, Vol. 22, ed. P. A. Thrower, Marcel Dekker, N. Y. and Basel, 1–143;

X. Bourrat (1993) Electrically conductive grades of carbon blacks: structure and properties, Carbon, 31, 2, 287–302; and X. Boutrat, R. Paillet and P. Hanusse (1993) Quantitative analysis of carbon coating anisotropy for CMC interfaces, Proceedings of 21st Biennial Conf. on Carbon, Buffalo, ACS ed.

Figure 3:
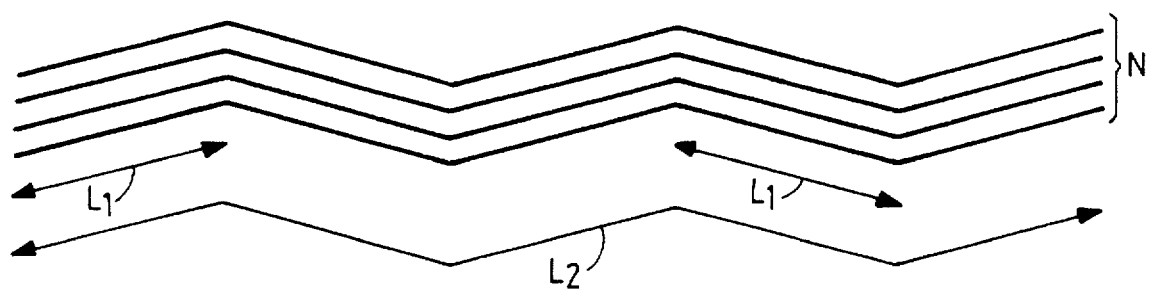
FIG. 3 is a highly diagrammatic illustration of the fringe texture of the 00.2 lattice of the pyrolytic carbon interphase of the invention.

FIG. 3 is very diagrammatic and shows the texture of the fringes of the 00.2 lattice for a PyC interphase as obtained using the invention.

The observed fringes have an undulating shape of relatively long length $L_2$, while the number N of layers that are stacked coherently is relatively small, thereby conferring a highly anisotropic character to the pyrolytic carbon.

Examples of implementing the method of the invention are described below.

EXAMPLE 1

Silicon carbide fibers (in fact of composition Si-C-O) and sold under the name "Nicalon NL-202" by the Japanese firm Nippon Carbon were provided, while they were in the form of fiber roving, with a PyC interphase of highly anisotropic lamellar microtexture. The interphase was made in pulsed manner in successive cycles as shown in FIG. 2. The time interval between instant $t_0$ at which the reaction gas was injected (propane) and instant $t_1$ at which the pressure $P_A$ (about 3 kPa) was reached was approximately equal to 0.1 s. The duration $D_A$ of the stage during which PyC was deposited was about 10 s, while the temperature in the infiltration chamber was equal to about 980° C. Finally, the time interval between instant $t_2$ at the beginning of reaction product extraction and the instant $t_3$ marking the beginning of the following cycle after returning to the pressure $P_R$, was about 2.5 s.

After the interphase had been formed, the fiber roving was densified using an SiC matrix implemented by chemical vapor infiltration, as described in document FR-A-2 401 888, for example.

Various samples A to E were made using interphases that differed from one another in the number of cycles that were performed, and thus in the number of elementary layers, and consequently in total thickness.

Mechanical characterization tests were performed on samples A to E.

By way of comparison, the same tests were performed on samples F and G obtained using the same fiber roving as that used for samples A to E and densified with an SiC matrix under the same conditions as the samples A to E. However, sample F had no interphase, while sample G had a PyC interphase made in a single continuous chemical vapor infiltration operation using a methane-based reaction gas and as described in document EP-A-0 172 082, for example.

The results of the measurements performed on samples A to G are given in Table I, in which:

σE designates the elastic stress limit;

εE designates the elastic deformation limit;

σR designates the ultimate tensile stress;

σR designates the ultimate tensile elongation; and

E designates the apparent modulus of elasticity.

microtexture and its very strongly anisotropic character: planes of atoms of large extent but slightly undulating, regular stacking of the planes, and uniformity of the microtexture both at small scale (of the order of 1 nanometer) and at large scale.

Structural characterization performed as described above gave the following results:

$L_1$ on average equal to 1 nanometer;

$L_2$ on average greater than 4 nanometers, with maximum values greater than 10 nanometers, extending up to 15 nanometers; and N generally not greater than 4 and on average equal to 3.

By way of comparison, characterization performed in the same manner on the PyC interphase of sample G gave the following results:

$L_1$ on average equal to 0.8 nanometers;

$L_2$ on average equal to 2.3 nanometers with maximum values no. greater than 6 nanometers; and N not less than 5.

Compared with the prior art PyC interphase, that obtained by performing the invention is therefore characterized by organization that is lateral rather than columnar.

EXAMPLE 2

Two-dimensional plies of cloth made of "Nicalon NL-202" fibers from the Japanese firm Nippon Carbon were coated using the same method as that described for sample D in Example 1 with 250 nm of PyC being deposited, the stacked plies were then densified by chemical vapor infiltration of silicon carbide using the method described in document FR-A-2 401 888. Test pieces having dimensions of 8 cm by 1 cm by 0.5 cm were then cut out (samples H) and tested mechanically in traction at ambient temperature.

By way of comparison, similar test pieces were obtained: either by replacing the PyC interphase of the invention with

TABLE I

| Sample | No. of cycles | PyC Thickness (nm) | σE(MPa) | εE(%) | σR(MPa) | εR(%) | E(GPa) |
|---|---|---|---|---|---|---|---|
| A | 40 | ≈50 | 216 | 0.18 | 300 | 0.23 | 120 |
| B | 90 | ≈100 | 300 | 0.21 | 470 | 0.56 | 142 |
| C | 150 | ≈150 | 386 | 0.31 | 549 | 0.56 | 124 |
| D | 240 | ≈250 | 387 | 0.26 | 939 | 1.13 | 148 |
| E | 800 | ≈1000 | 221 | 0.21 | 511 | 0.84 | 105 |
| F | — | ≈0 | 110 | 0.08 | 120 | 0.15 | 137 |
| G | — | ≈100 | 153 | 0.11 | 230 | 0.23 | 139 |

The results of Table I show that making a lamellar interphase of controlled microtexture, built up in layers of nanometer-sized thickness, in accordance with the method of the invention makes it possible to optimize the interphase with respect to the mechanical properties of the resulting composite. In addition, for the material of the samples tested that has the optimum interphase (sample D), the measured ultimate tensile stress (939 MPa) is close to the theoretical maximum value that could be expected from the fibers used (1100 MPa), which is far from being true of the value measured on the composite made using a conventional PyC interphase (230 MPa).

Figure 4:
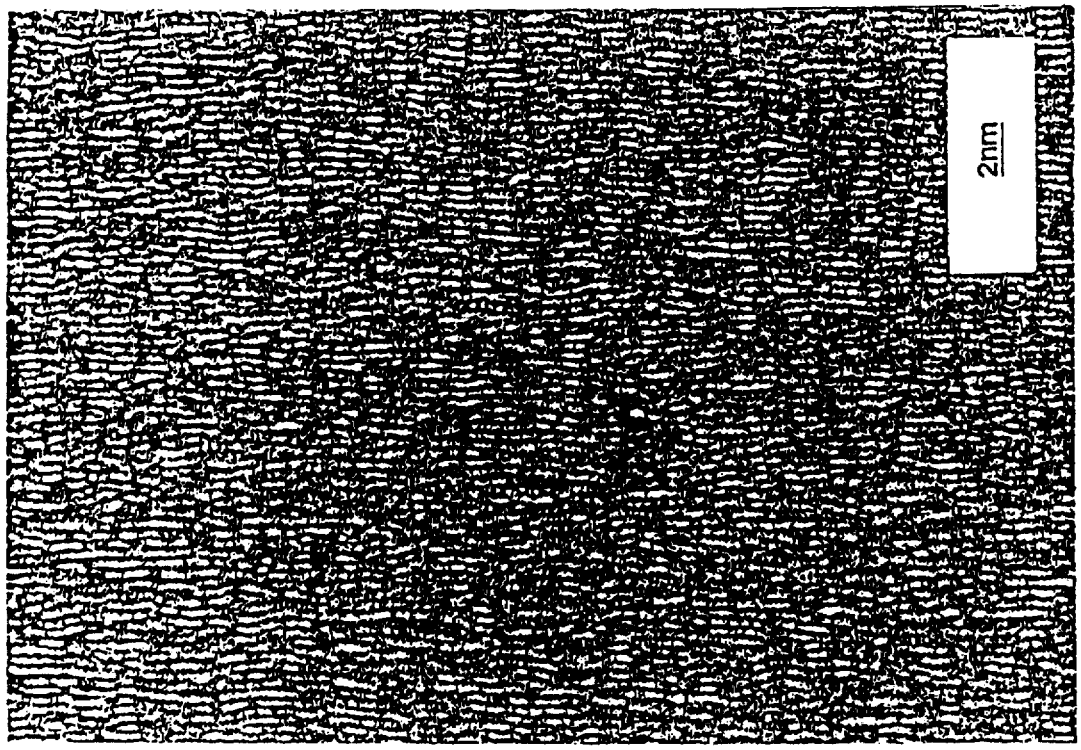
FIG. 4 is an image obtained by a transmission electron microscope showing an interphase of pyrolytic carbon with controlled lamellar microtexture, as obtained by a method of the invention.

FIG. 4 shows an image obtained by a transmission electron microscope (high resolution lattice fringe mode) of a PyC interphase obtained in accordance with the invention on sample D. It shows clearly the almost perfect control of the a conventional 0.1 µm thick PyC interphase obtained by conventional chemical vapor infiltration using methane (samples I), or else by interposing no PyC interphase between the fibers and the SiC matrix (samples J).

The results of mechanical tests given in Table II again show the advantage of PyC interphase composites in accordance with the invention since ultimate stress and deformation are increased respectively by 80% and by 400% relative to conventional PyC interphase composites, which are themselves considerably better than composites having no interphase.

TABLE II

| Sample | σE(MPa) | εE(%) | σR(MPa) | εR(%) |
|---|---|---|---|---|
| H | 185 | 0.10 | 352 | 1.0 |
| I | 162 | 0.09 | 180 | 0.25 |
| J | 80 | 0.04 | 80 | 0.05 |

EXAMPLE 3

Using a method of the invention, carbon fibers sold under the reference "T 300" by the Japanese firm Toray were coated while in the form of roving with a PyC interphase of two different thicknesses, after which they are were densified by silicon carbide using the procedure described in Example 1. Samples K and L were obtained with interphases having thicknesses respectively of 0.5 μm and of 1 μm. By way of comparison, a sample (M) was made by interposing a PyC interphase between the fibers and the matrix using conventional chemical vapor infiltration in non-cyclic manner, and based on propane.

The results of traction tests performed at ambient temperature on samples K, L, and M are given in Table III. They again show that composites possessing a PyC interphase of the invention have improved mechanical properties. Thus, for given interphase thickness of 1 μm, deposited using the same precursor (propane), sample L having the PyC interphase of the invention has ultimate tensile strength and deformation that are about 50% better than sample M having a conventional PyC interphase. This example shows that the improvement in properties is the result, at least in part, of the controlled microtexture of the interphase and of the particular way in which it is made (layer of nanometer-sized thickness by layer of nanometer-sized thickness).

TABLE III

| Sample | σE(MPa) | εE(%) | σR(MPa) | εR(%) | E(GPa) |
|---|---|---|---|---|---|
| K | 150 | 0.11 | 570 | 1.0 | 136 |
| L | 164 | 0.13 | 605 | 1.1 | 126 |
| M | 132 | 0.10 | 416 | 0.78 | 132 |

EXAMPLE 4

Cloths made of "T 300" fibers from the Japanese firm Toray were stacked within two pieces Of graphite tooling to constitute a preform, after which a first batch was coated with a PyC interphase having a thickness of 500 nm and obtained in accordance with the invention under infiltration conditions as given above for Example 1, while a second batch was coated with a PyC interphase having a thickness of 700 nm and obtained using the conventional chemical vapor infiltration method (with the difference in thickness being due to the fact that it is more difficult to control thickness using conventional infiltration). The two preforms were densified with an SiC matrix using the conventional chemical vapor infiltration method. Test pieces were taken from both composites and tested in traction at ambient temperature.

The observed ultimate stresses were respectively 450 MPa for the composite having a PyC interphase of the invention and only 350 MPa for the composite having the conventional PyC interphase. This further example shows the advantage of the interphase of the invention, in spite of its thickness being smaller (it being accepted that in C/SiC composites, the optimum thickness for a PyC interphase lies at about 1 μm).

We claim:

1. A composite material comprising fiber reinforcement densified by a matrix and a lamellar interphase coating of anisotropic pyrolytic carbon formed between the reinforcing fibers and the matrix, wherein the lamellar interphase is constituted by a highly anisotropic pyrolytic carbon whose 00.2 lattice fringe texture has distorted fringes of total length $L_2$ that is on average not less than 4 nanometers with a maximum value that exceeds 10 nanometers, and in which the number N of elementary layers stacked coherently along the c crystallographic axis is on average not more than 4.

2. The composite material of claim 1, wherein said reinforcing fibers comprise carbon.

3. The composite material of claim 1, wherein said reinforcing fibers comprise a ceramic.

4. The composite material of claim 1, wherein said reinforcing fibers comprise silicon carbide.

5. The composite material of claim 1, wherein said matrix comprises a ceramic.

6. The composite material of claim 1, wherein said matrix comprises silicon carbide.

* * * * *

UNITED STATES PATENT AND TRADEMARK OFFICE
CERTIFICATE OF CORRECTION

PATENT NO. : 5,514,453

DATED : May 7, 1996

INVENTOR(S) : Stephane Goujard, et al.

It is certified that error appears in the above-indentified patent and that said Letters Patent is hereby corrected as shown below:

On the title page, item [54] and Col. 1, lines 1-2,

In the Title, "METHOD OF MANUFACTURING A COMPOSITE" should read:

--METHOD OF MANUFACTURING A COMPOSITE MATERIAL HAVING A PYROLYTIC CARBON INTERPHASE OF LAMELLAR MICROTEXTURE BETWEEN REINFORCING FIBERS AND A MATRIX, AND A MATERIAL AS OBTAINED BY THE METHOD--.

Column 3, line 53, "pyrolyric" should read --pyrolytic--.

Column 4, line 28, "performs" should read --preforms--.

Column 5, line 55, "pyrolyric" should read --pyrolytic--.

Column 5, line 63, "pyrolyric" should read --pyrolytic--.

Column 7, line 36, "$\sigma R$ designates the ultimate tensile elongation; and" should read --$\varepsilon R$ designates the ultimate tensile elongation; and--.

UNITED STATES PATENT AND TRADEMARK OFFICE
CERTIFICATE OF CORRECTION

PATENT NO.   : 5,514,453
DATED        : May 7, 1996
INVENTOR(S)  : Stephane Goujard, et al It is certified that error appears in the above-indentified patent and that said Letters Patent is hereby corrected as shown below:

Column 9, line 47, "pieces Of graphite" should read -- pieces of graphite --.

Signed and Sealed this

Tenth Day of December, 1996

Attest:

BRUCE LEHMAN

Attesting Officer

Commissioner of Patents and Trademarks